UNITED STATES PATENT OFFICE.

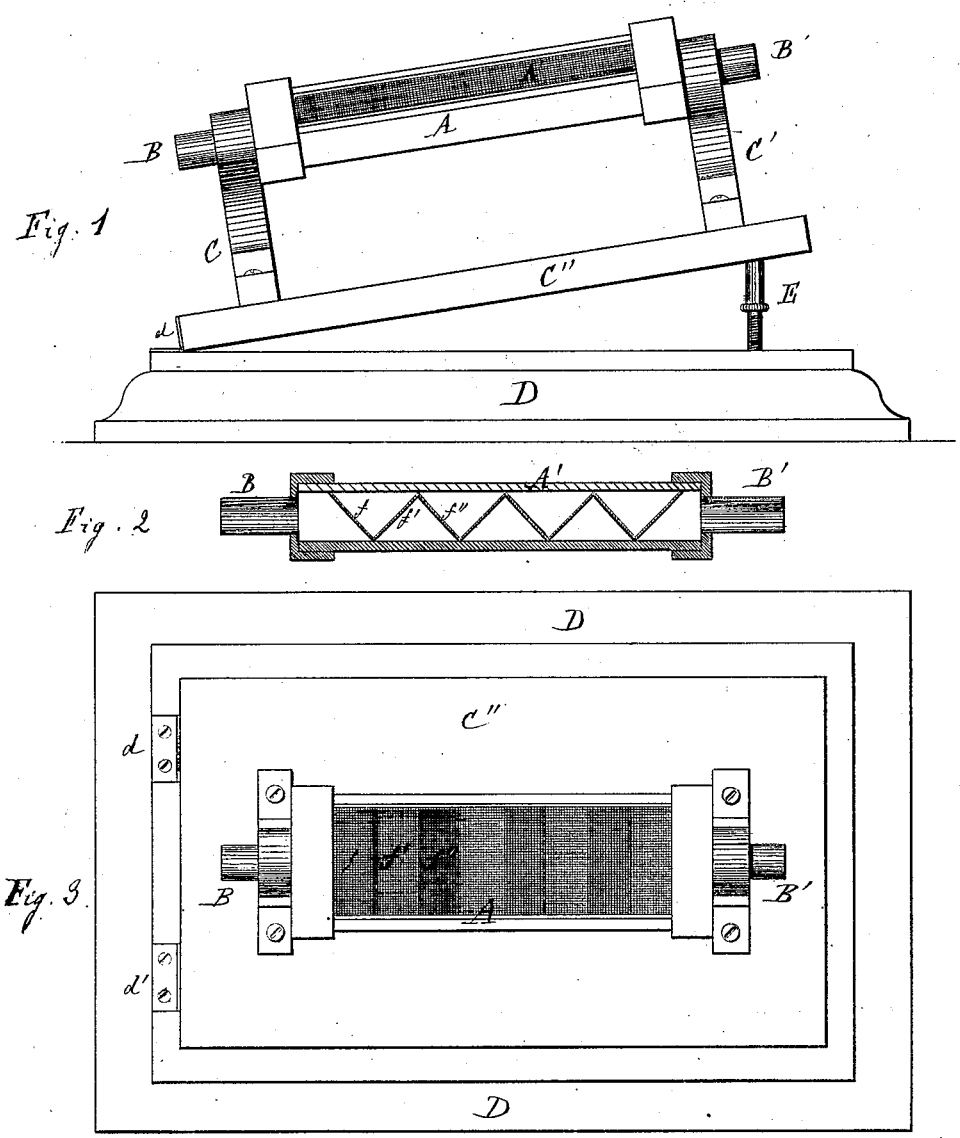

EUGÉNE MOREAU, OF SAN FRANCISCO, CALIFORNIA.

IMPROVEMENT IN APPARATUS FOR THE PRODUCTION OF HOT AIR.

Specification forming part of Letters Patent No. 201,439, dated March 19, 1878; application filed May 23, 1877.

*To all whom it may concern:*

Be it known that I, EUGÉNE MOREAU, of the city and county of San Francisco, State of California, have invented new and Improved Apparatus for the Production of Hot Air; and the following is a clear and exact description of the same.

My invention relates to that class of hot-air apparatus where the air is heated by its passage through hot diaphragms, (for which apparatus I have heretofore made application on the 8th of September, 1876, for the granting of Letters Patent;) and consists in an improvement whereby the said diaphragms are heated by the direct action of the solar rays.

For the better description of my invention I will refer to the annexed drawings, in which—

Figure 1 is a side elevation. Fig. 2 is a longitudinal section of the diaphragms and box containing them, and Fig. 3 is a top view of the apparatus.

A is the box or flue, open at both ends, through the hollow bearings B B'. The flue A is made of wood, and provided with a glass cover, A'. Any good diathermanous substance will answer as well as glass. The bearings B B' fit into holes provided for them in the stands C C', and the stands C C' are fastened to the plate C''.

D is the bed-plate of the machine, to which the platform C is attached by means of the hinges $d$ $d'$. The bed-plate D is provided with a screw, E, for the purpose of regulating the angle of the plate C'' with the bed D. With the aid of the screw E and the bearings B B' the flue can always be turned in the proper direction toward the sun.

By referring to the longitudinal section in Fig. 2 we see that the flue is provided with partitions $f f' f''$, running at right angles with the sides of the flue, and at an angle of forty-five degrees with the bottom, thus dividing the flue into triangular spaces. These partitions are made of blackened copper-wire gauze, and are placed there for the purpose of absorbing the heat of the solar rays, which strike them when the apparatus is turned toward the sun.

It is obvious that the air will be heated in its passage through the flue by coming in contact with the hot wire-gauze of the partitions, and will have only to be led, by an additional pipe, to the place where it is needed.

Having thus described my improvements, what I claim, and desire to secure by Letters Patent, is—

1. The combination of the flue A, diaphragms $f f' f''$, and diathermanous cover A', substantially as and for the purpose described.

2. The combination of the flue A, provided with cover and diaphragms, with the adjusting mechanism composed of the bearings B B', plate C'', bed-plate D, and set-screw E, substantially as and for the purpose described.

EUGÉNE MOREAU.

Witnesses:
HERB. B. MOORE,
WM. O. GOULD.